US011996035B2

(12) United States Patent
Han et al.

(10) Patent No.: US 11,996,035 B2
(45) Date of Patent: May 28, 2024

(54) PIXEL CIRCUIT AND METHOD FOR DRIVING SAME, DISPLAY PANEL, AND DISPLAY DEVICE

(71) Applicant: BOE Technology Group Co., Ltd., Beijing (CN)

(72) Inventors: Seungwoo Han, Beijing (CN); Li Xiao, Beijing (CN); Haoliang Zheng, Beijing (CN); Dongni Liu, Beijing (CN); Jiao Zhao, Beijing (CN); Liang Chen, Beijing (CN); Hao Chen, Beijing (CN); Minghua Xuan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 150 days.

(21) Appl. No.: 17/639,790

(22) PCT Filed: Mar. 11, 2021

(86) PCT No.: PCT/CN2021/080296

§ 371 (c)(1),
(2) Date: Mar. 2, 2022

(87) PCT Pub. No.: WO2022/188109

PCT Pub. Date: Sep. 15, 2022

(65) Prior Publication Data

US 2023/0351944 A1 Nov. 2, 2023

(51) Int. Cl.
*G09G 3/32* (2016.01)

(52) U.S. Cl.
CPC ....... *G09G 3/32* (2013.01); *G09G 2300/0842* (2013.01); *G09G 2310/061* (2013.01)

(58) Field of Classification Search
CPC .. G09G 3/3233; G09G 3/3266; G09G 3/3258; G09G 3/3291; G09G 3/3225;
(Continued)

(56) References Cited

U.S. PATENT DOCUMENTS

| | | | | |
|---|---|---|---|---|
| RE44,563 E * | 10/2013 | Yamashita | ........... | G09G 3/3233 345/206 |
| 2004/0217925 A1 | 11/2004 | Chung et al. | | |

(Continued)

FOREIGN PATENT DOCUMENTS

| | | |
|---|---|---|
| CN | 101515435 A | 8/2009 |
| CN | 102708791 A | 10/2012 |
| CN | 109599062 A | 4/2019 |

*Primary Examiner* — Dong Hui Liang
(74) *Attorney, Agent, or Firm* — IPro, PLLC

(57) ABSTRACT

Provided is a pixel circuit. The pixel circuit includes a reset circuit, a data write circuit, a light-emission control circuit, and a drive circuit; wherein the reset circuit is configured to transmit a reset power signal supplied by the reset power terminal to the first node in response to a reset control signal; the data write circuit is configured to transmit a data signal supplied by the data signal terminal to the first node in response to a gate drive signal; the light-emission control circuit is configured to control conduction/non-conduction between the cathode of the light-emitting element and the second node, and control conduction/non-conduction between the third node and the pull-down power terminal, in response to a light-emission control signal; and the drive circuit is configured to control conduction/non-conduction between the second node and the third node in response to a potential of the first node.

14 Claims, 11 Drawing Sheets

(58) Field of Classification Search
CPC .... G09G 3/32; G09G 3/20; G09G 2300/0842; G09G 2300/0861; G09G 2300/0426; G09G 2320/0233; G09G 2320/043; G09G 2320/045; G09G 2310/08; G09G 2310/0251; G09G 2310/0262
See application file for complete search history.

(56) References Cited

U.S. PATENT DOCUMENTS

| | | | | |
|---|---|---|---|---|
| 2009/0207105 | A1* | 8/2009 | Hwang ................ | G09G 3/3233 345/76 |
| 2010/0220086 | A1 | 9/2010 | Chung et al. | |
| 2014/0191669 | A1 | 7/2014 | Tan et al. | |
| 2015/0221251 | A1* | 8/2015 | Wang ................... | G09G 3/3233 345/82 |
| 2017/0061875 | A1 | 3/2017 | Cho et al. | |
| 2020/0027401 | A1 | 1/2020 | Park | |
| 2020/0066212 | A1 | 2/2020 | Kim et al. | |
| 2020/0273411 | A1 | 8/2020 | Gao et al. | |

* cited by examiner

PIXEL CIRCUIT AND METHOD FOR DRIVING SAME, DISPLAY PANEL, AND DISPLAY DEVICE

CROSS-REFERENCE TO RELATED APPLICATION

This application is a U.S. national stage of international application No. PCT/CN2021/080296, filed on Mar. 11, 2021, the disclosure of which is herein incorporated by reference in its entirety.

TECHNICAL FIELD

The present disclosure relates to the field of display technologies, and in particular, relates to a pixel circuit and a method for driving the same, a display panel, and a display device.

BACKGROUND

A pixel in a display device generally includes a pixel circuit and a light-emitting element. The pixel circuit is capable of outputting a drive signal to the light-emitting element to drive the light-emitting element to emit light.

In the related art, the pixel circuit generally includes a light-emission control circuit and a drive circuit. Both the light-emission control circuit and the drive circuit are connected to an anode of the light-emitting element, and a cathode of the light-emitting element is connected to a pull-down power terminal. The light-emission control circuit is configured to control the drive circuit to transmit a drive signal to the anode of the light-emitting element, such that the light-emitting element emits light under the action of a voltage difference between the drive signal and a pull-down power signal supplied by the pull-down power terminal.

SUMMARY

Embodiments of the present disclosure provide a pixel circuit and a method for driving the same, a display panel, and a display device. The technical solutions are as follows.

In one aspect, a pixel circuit is provided. The pixel circuit includes: a reset circuit, a data write circuit, a light-emission control circuit, and a drive circuit; wherein the reset circuit is connected to a reset control terminal, a reset power terminal, and a first node, and the reset circuit is configured to transmit a reset power signal supplied by the reset power terminal to the first node in response to a reset control signal supplied by the reset control terminal;

the data write circuit is connected to a gate signal terminal, a data signal terminal, and the first node, and the data write circuit is configured to transmit a data signal supplied by the data signal terminal to the first node in response to a gate drive signal supplied by the gate signal terminal;

the light-emission control circuit is connected to a light-emission control terminal, a pull-down power terminal, a second node, a third node, and a cathode of a light-emitting element, and an anode of the light-emitting element is connected to a drive power terminal; the light-emission control circuit is configured to control conduction/non-conduction between the cathode of the light-emitting element and the second node, and control conduction/non-conduction between the third node and the pull-down power terminal, in response to a light-emission control signal supplied by the light-emission control terminal; and the drive circuit is connected to the first node, the second node, and the third node, and the drive circuit is configured to control conduction/non-conduction between the second node and the third node in response to a potential of the first node.

Optionally, the light-emission control circuit includes: a first light-emission control sub-circuit and a second light-emission control sub-circuit; wherein the first light-emission control sub-circuit is connected to the light-emission control terminal, the cathode of the light-emitting element, and the second node, and the first light-emission control sub-circuit is configured to control conduction/non-conduction between the cathode of the light-emitting element and the second node in response to the light-emission control signal; and the second light-emission control sub-circuit is connected to the light-emission control terminal, the third node, and the pull-down power terminal, and the second light-emission control sub-circuit is configured to control conduction/non-conduction between the third node and the pull-down power terminal in response to the light-emission control signal.

Optionally, the first light-emission control sub-circuit includes a first light-emission control transistor, and the second light-emission control sub-circuit includes a second light-emission control transistor; wherein a gate electrode of the first light-emission control transistor is connected to the light-emission control terminal, a first electrode of the first light-emission control transistor is connected to the cathode of the light-emitting element, and a second electrode of the first light-emission control transistor is connected to the second node; and a gate electrode of the second light-emission control transistor is connected to the light-emission control terminal, a first electrode of the second light-emission control transistor is connected to the third node, and a second electrode of the second light-emission control transistor is connected to the pull-down power terminal.

Optionally, the reset circuit is further connected to the cathode of the light-emitting element, and the reset circuit is further configured to transmit the reset power signal to the cathode of the light-emitting element in response to the reset control signal.

Optionally, the reset circuit includes: a first reset sub-circuit and a second reset sub-circuit; wherein the first reset sub-circuit is connected to the reset control terminal, the reset power terminal, and the first node, and the first reset sub-circuit is configured to transmit the reset power signal to the first node in response to the reset control signal; and the second reset sub-circuit is connected to the reset control terminal, the reset power terminal, and the cathode of the light-emitting element, and the second reset sub-circuit is configured to transmit the reset power signal to the cathode of the light-emitting element in response to the reset control signal.

Optionally, the first reset sub-circuit includes a first reset transistor, and the second reset sub-circuit includes a second reset transistor; wherein a gate electrode of the first reset transistor is connected to the reset control terminal, a first electrode of the first reset transistor is connected to the reset power terminal, and a second electrode of the first reset transistor is connected to the first node; and a gate electrode of the second reset transistor is connected to the reset control terminal, a first electrode of the second reset transistor is connected to the reset power terminal, and a second electrode of the second reset transistor is connected to the cathode of the light-emitting element.

Optionally, the data write circuit is further connected to the second node and the third node; and the data write circuit is configured to transmit the data signal to the third node and control conduction/non-conduction between the second node and the first node, in response to the gate drive signal.

Optionally, the data write circuit includes a first data write sub-circuit and a second data write sub-circuit; wherein the first data write sub-circuit is connected to the gate signal terminal, the data signal terminal, and the third node, and the first data write sub-circuit is configured to transmit the data signal to the third node in response to the gate drive signal; and the second data write sub-circuit is connected to the gate signal terminal, the second node, and the first node, and the second data write sub-circuit is configured to control conduction/non-conduction between the second node and the first node in response to the gate drive signal.

Optionally, the first data write sub-circuit includes a first data write transistor, and the second data write sub-circuit includes a second data write transistor; wherein a gate electrode of the first data write transistor is connected to the gate signal terminal, a first electrode of the first data write transistor is connected to the data signal terminal, and a second electrode of the first data write transistor is connected to the third node; and a gate electrode of the second data write transistor is connected to the gate signal terminal, a first electrode of the second data write transistor is connected to the second node, and a second electrode of the second data write transistor is connected to the first node.

Optionally, the pixel circuit further includes a potential regulation circuit; wherein the potential regulation circuit is connected to the pull-down power terminal and the first node, and the potential regulation circuit is configured to regulate the potential of the first node in response to a pull-down power signal supplied by the pull-down power terminal.

Optionally, the potential regulation circuit includes a storage capacitor; wherein a first end of the storage capacitor is connected to the first node, and a second end of the storage capacitor is connected to the pull-down power terminal.

Optionally, the drive circuit includes a drive transistor; wherein a gate electrode of the drive transistor is connected to the first node, a first electrode of the drive transistor is connected to the second node, and a second electrode of the drive transistor is connected to the third node.

In another aspect, a method for driving a pixel circuit is provided, which is applicable to the pixel circuit as defined in the above aspect. The method includes:

transmitting a reset power signal supplied by a reset power terminal to a first node by a reset circuit in response to the reset power signal in a reset phase where a potential of the reset power signal supplied by the reset power terminal is a first potential, wherein the potential of the reset power signal is the first potential;

transmitting a data signal supplied by a data signal terminal to the first node by a data write circuit in response to a gate drive signal supplied by a gate signal terminal in a data write phase where all potentials of the gate drive signal are the first potential; and controlling a second node and a third node to be conducted by a drive circuit in response to a potential of the first node, and controlling a cathode of a light-emitting element and the second node to be conducted, and the third node and a pull-down power terminal to be conducted by a light-emission control circuit in response to a light-emission control signal supplied by a light-emission control terminal, in a light emitting phase where each of the potential of the first node and a potential of the light-emission control signal is the first potential.

In yet another aspect, a display panel is provided. The display panel includes: a base substrate and a plurality of pixels disposed on the base substrate; wherein each of the plurality of pixels includes a light-emitting element, and the pixel circuit as defined in the above aspect; wherein the pixel circuit is connected to the light-emitting elements, and is configured to drive the light-emitting element to emit light.

In still another aspect, a display device is provided. The display device includes: a power supply assembly, and the display panel as defined in the above aspect; wherein the power supply assembly is connected to the display panel, and the power supply assembly is configured to supply power to the display panel.

BRIEF DESCRIPTION OF THE DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

For clearer descriptions of the objectives, technical solutions, and advantages of the present disclosure, the present disclosure is further described in detail hereinafter in conjunction with the accompanying drawings.

A transistor used in all embodiments of the present disclosure may be a thin-film transistor, a field-effect transistor, or other devices having the same characteristics. The transistor used in the embodiments of the present disclosure is mainly a switch transistor based on its functions in a circuit. A source electrode and a drain electrode of the switch transistor used herein are symmetrical, and thus are interchangeable. In some embodiments of the present disclosure, the source electrode is referred to as a first electrode, and the drain electrode is referred to as a second electrode. Based on the forms in the accompanying drawings, an intermediate terminal of the transistor is defined as a gate electrode, a signal input terminal is defined as a source electrode, and a signal output terminal is defined as a drain electrode. In addition, the switch transistor used in the embodiments of the present disclosure may include any one of a P-type switch transistor and an N-type switch transistor. The P-type switch transistor is conducted in the case that the gate electrode is at a low level, and is turned off in the case that the gate electrode is at a high level; and the N-type switch transistor is conducted in the case that the gate electrode is at the high level, and is turned off in the case that the gate electrode is at the low level. In addition, a plurality of signals in the embodiments of the present disclosure correspond to a first potential and a second potential. The first potential and the second potential merely represent that the potential of a signal possesses two status quantities, rather than a specific value in the full text.

Figure 1:
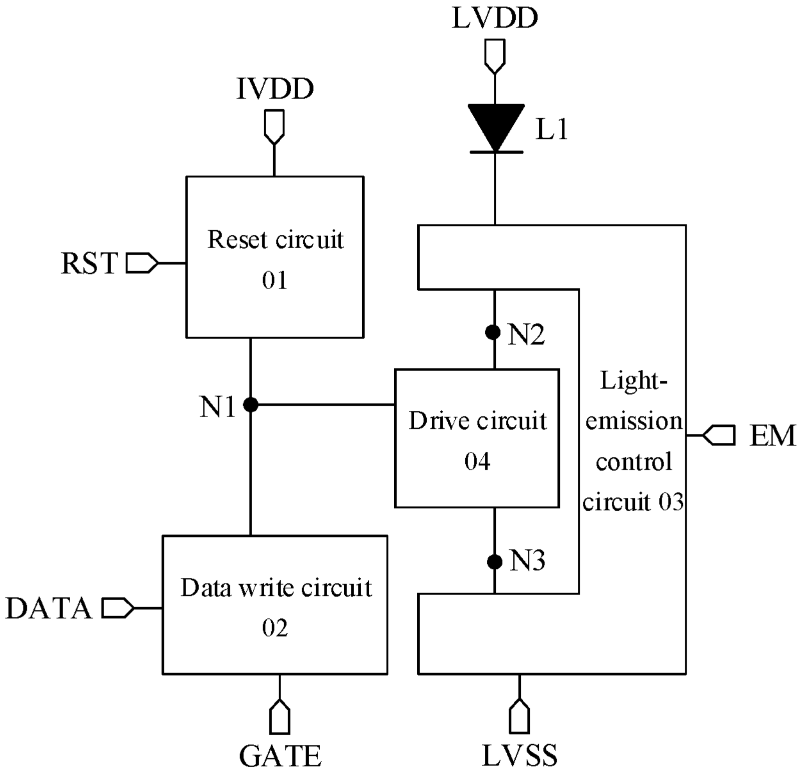
FIG. 1 is a schematic structural diagram of a pixel circuit according to an embodiment of the present disclosure.

FIG. 1 is a schematic structural diagram of a pixel circuit according to an embodiment of the present disclosure. As shown in FIG. 1, the pixel circuit includes: a reset circuit 01, a data write circuit 02, a light-emission control circuit 03, and a drive circuit 04.

The reset circuit 01 may be connected to a reset control terminal RST, a reset power terminal IVDD, and a first node N1. The reset circuit 01 may be configured to transmit a reset power signal supplied by the reset power terminal IVDD to the first node N1 in response to a reset control signal supplied by the reset control terminal RST.

For example, the reset circuit 01 may transmit the reset power signal supplied by the reset power terminal IVDD to the first node N1 in the case that a potential of the reset control signal supplied by the reset control terminal RST is a first potential. The potential of the reset power signal may be the first potential. Optionally, the first potential may be a valid potential.

The data write circuit 02 may be connected to a gate signal terminal GATE, a data signal terminal DATA, and the first node N1. The data write circuit 02 may be configured to transmit a data signal supplied by the data signal terminal DATA to the first node N1 in response to a gate drive signal supplied by the gate signal terminal GATE.

For example, the data write circuit 02 may transmit the data signal supplied by the data signal terminal DATA to the first node N1 in the case that the potential of the gate drive signal supplied by the gate signal terminal GATE is the first potential.

The light-emission control circuit 03 may be connected to a light-emission control terminal EM, a pull-down power terminal LVSS, a second node N2, a third node N3, and a cathode of a light-emitting element L1, and an anode of the light-emitting element L1 may be connected to a drive power terminal LVDD. The light-emission control circuit 03 may be configured to control conduction/non-conduction between the cathode of the light-emitting element L1 and the second node N2, and control conduction/non-conduction between the third node N3 and the pull-down power terminal LVSS, in response to a light-emission control signal supplied by the light-emission control terminal EM.

For example, the light-emission control circuit 03 may control the cathode of the light-emitting element L1 and the second node N2 to be conducted, and control the third node N3 and the pull-down power terminal LVSS to be conducted, in the case that a potential of the light-emission control signal supplied by the light-emission control terminal EM is the first potential. The light-emission control circuit 03 may control the cathode of the light-emitting element L1 to be disconnected to the second node N2, and control the third node N3 to be disconnected to the pull-down power terminal LVSS, in the case that the potential of the light-emission control signal is a second potential. Optionally, the second potential may be an invalid potential, and the second potential may be a low potential relative to the first potential.

The drive circuit 04 may be connected to the first node N1, the second node N2, and the third node N3. The drive circuit 04 may be configured to control conduction/non-conduction between the second node N2 and the third node N3 in response to the potential of the first node N1. That is, the first node N1 is a control node configured to control an operation of the drive circuit 04.

For example, the drive circuit 04 may control the second node N2 and the third node N3 to be conducted in the case that the potential of the first node N1 is the first potential. The drive circuit 04 may control the second node N2 to be disconnected to the third node N3 in the case that the potential of the first node N1 is the second potential.

In the embodiments of the present disclosure, the drive power terminal LVDD, the light-emitting element L1, the second node N2, the third node N3, and the pull-down power terminal LVSS form a loop in the case that the drive circuit 04 controls the second node N2 and the third node N3 to be conducted, and the light-emission control circuit 03 controls the cathode of the light-emitting element L1 and the second node N2 to be conducted and controls the third node N3 and the pull-down power terminal LVSS to be conducted. The pull-down power terminal LVSS may transmit a pull-down power signal to the third node N3 via the light-emission control circuit 03, and a potential of the pull-down power signal may be the second potential. The drive circuit 04 may transmit a drive signal (such as a drive current) to the first node N1 in response to the potential of the first node N1 and the potential of the third node N3 (i.e., the potential of the pull-down power signal). Furthermore, the light-emitting element L1 may emit light under the drive of the drive signal.

However, in the related art, a potential of the drive signal transmitted by the drive circuit to the light-emitting element is fluctuated under the influence of a potential of the anode the light-emitting element, thereby causing a poor display effect of the display device.

Referring to FIG. 1, as the first node N1 described in the embodiments of the present disclosure is not directly or indirectly connected to electrodes (including the anode and the cathode) of the light-emitting element L1, the potential of the first node N1 is not affected by the potential of the electrodes of the light-emitting element L1, and the potential of the first node N1 may be kept stable. Furthermore, based on the principle of driving the light-emitting element L1 to emit light as described above, the drive circuit 04 may transmit the drive signal capable of allowing the light-emitting element L1 to accurately represent a gray scale to the light-emitting element L1 based on the potential of the first node N1 and the potential of the third node N3. In this way, a display device including the pixel circuit achieves a better display effect.

In summary, the embodiments of the present disclosure provide a pixel circuit. The drive circuit in the pixel circuit may control conduction/non-conduction between the second node and the third node under the control of the potential of the first node. The light-emission control circuit in the pixel circuit may control conduction/non-conduction between the cathode of the light-emitting element and the second node, and control conduction/non-conduction between the third node and the pull-down power terminal, under the control of the light-emission control signal. In this way, the potential of the first node is not affected by the potential of the anode of the light-emitting element. Furthermore, in the case that the cathode of the light-emitting element and the second node are conducted, the second node and the third node are conducted, and the third node and the pull-down power terminal are conducted, the light-emitting element may emit light reliably. The display device including the pixel circuit possesses a greater display effect.

Figure 2:
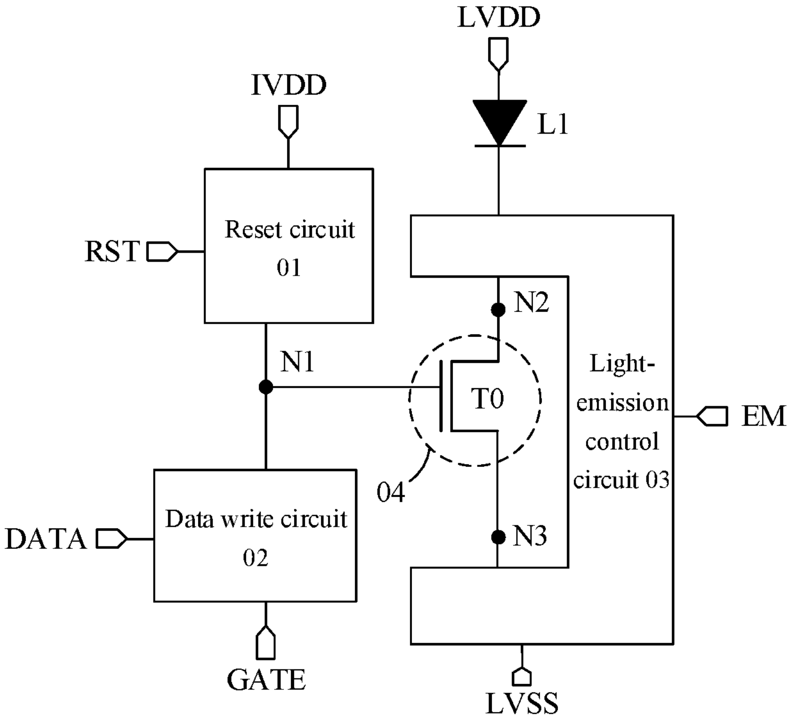
FIG. 2 is a schematic structural diagram of another pixel circuit according to an embodiment of the present disclosure.

FIG. 2 is a schematic structural diagram of another pixel circuit according to an embodiment of the present disclosure. As shown in FIG. 2, the drive circuit 04 in the pixel circuit may include a drive transistor T0.

A gate electrode of the drive transistor T0 may be connected to the first node N1, a first electrode of the drive transistor T0 may be connected to the third node N3, and a second electrode of the drive transistor T0 may be connected to the second node N2.

Optionally, the first electrode of the drive transistor T0 may be referred to as a source electrode, and the second electrode of the drive transistor T0 may be referred to as a drain electrode. Optionally, the first electrode of the drive transistor T0 may be referred to as the drain electrode, and the second electrode of the drive transistor T0 may be referred to as the source electrode.

Figure 3:
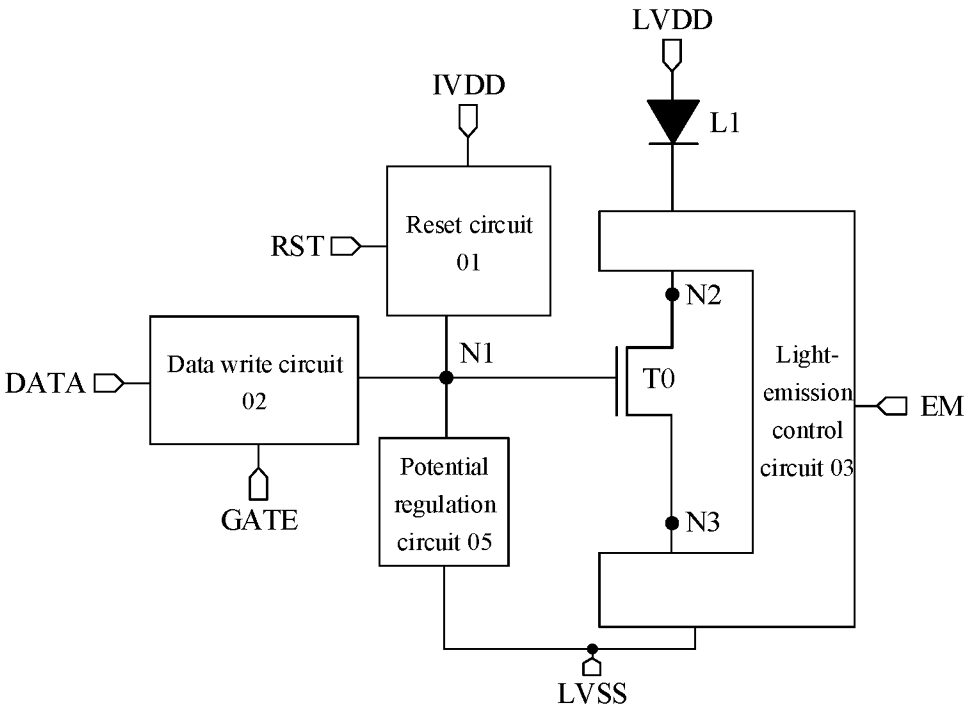
FIG. 3 is a schematic structural diagram of yet another pixel circuit according to an embodiment of the present disclosure.

FIG. 3 is a schematic structural diagram of yet another pixel circuit according to an embodiment of the present disclosure. As shown in FIG. 3, the pixel circuit may further include a potential regulation circuit 05.

The potential regulation circuit 05 may be connected to the pull-down power terminal LVSS and the first node N1. The potential regulation circuit 05 may be configured to regulate the potential of the first node N1 in response to a pull-down power signal supplied by the pull-down power terminal LVSS.

By setting the potential regulation circuit 05 to flexibly regulate the potential of the first node N1, the stability of the potential of the first node N1 may be ensured. Furthermore, it can be further ensured that the drive circuit 04 (i.e., the drive transistor T0 illustrated in FIG. 3) transmits the drive signal capable of allowing the light-emitting element L1 to accurately represent the gray scale to the light-emitting element L1 in response to the potential of the first node N1 and the potential of the third node N3.

In addition, as the potential regulation circuit 05 is connected to the pull-down power terminal LVSS, and is not directly or indirectly connected to the electrodes of the light-emitting element L1, the potential of the electrodes of the light-emitting element L1 is not affected by the potential regulation circuit 05, and the potential regulation circuit 05 may not regulate the potential of the first node N1 in response to the potential of the electrodes of the light-emitting element L1. That is, it is ensured that the potential of the first node N1 and the potential of the electrodes of the light-emitting element L1 do not affect each other, which further ensures great potential stability of the first node N1.

Figure 4:
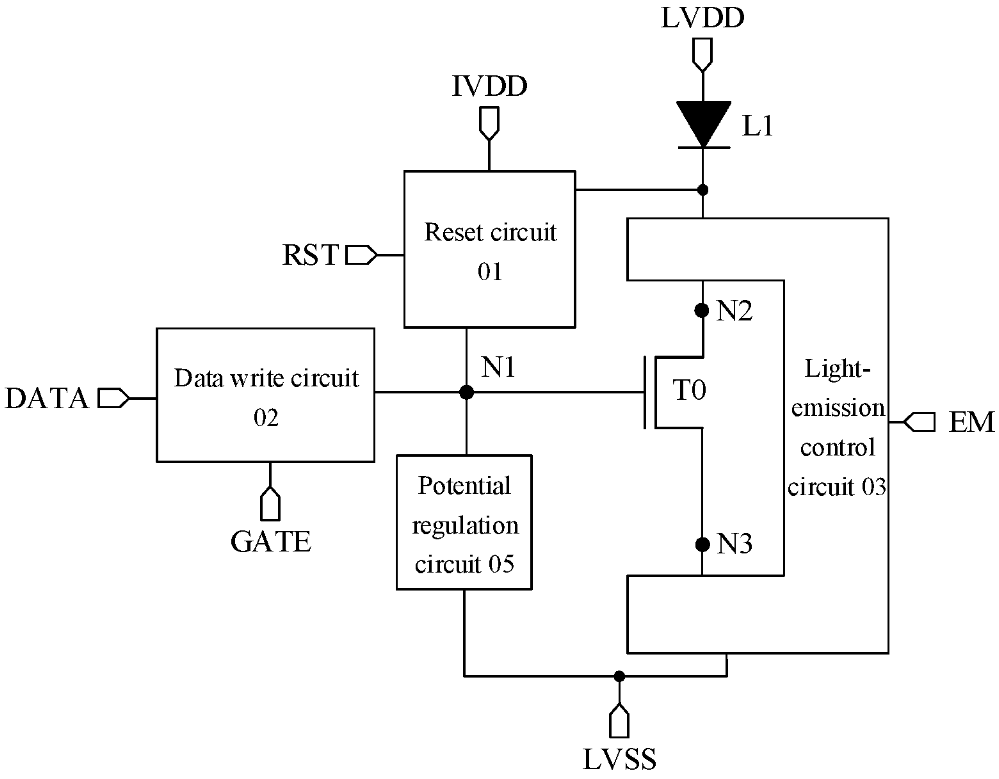
FIG. 4 is a schematic structural diagram of still another pixel circuit according to an embodiment of the present disclosure.

FIG. 4 is a schematic structural diagram of yet another pixel circuit according to an embodiment of the present disclosure. As shown in FIG. 4, in the pixel circuit, the reset circuit 01 may further be connected to the cathode of the light-emitting element L1. The reset circuit 01 may further be configured to transmit the reset power signal to the cathode of the light-emitting element L1 in response to the reset control signal.

For example, the reset circuit 01 may transmit the reset power signal to the cathode of the light-emitting element L1 in the case that the potential of the reset control signal is the first potential, so as to reset and denoise the cathode of the light-emitting element L1. In this way, each time the light-emitting element L1 is driven to emit light, the cathode of the light-emitting element L1 is reset by the reset circuit 01 to ensure that the light-emitting element L1 reliably receives the drive signal in the next light emitting phase, which further ensures that the light emitted by the light-emitting element L1 may accurately represent the gray scale.

Figure 5:
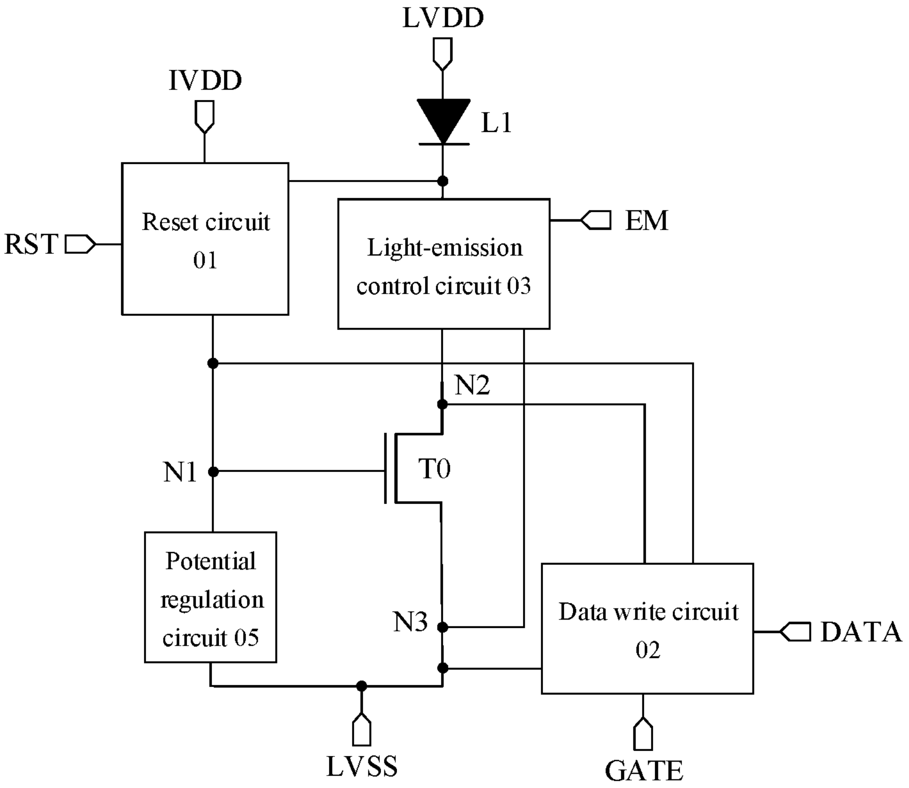
FIG. 5 is a schematic structural diagram of still another pixel circuit according to an embodiment of the present disclosure.

FIG. 5 is a schematic structural diagram of still another pixel circuit according to an embodiment of the present disclosure. As shown in FIG. 5, the data write circuit 02 may further be connected to the second node N2 and the third node N3.

The data write circuit 02 may be configured to transmit the data signal to the third node N3, and control conduction/non-conduction between the second node N2 and the first node N1, in response to the gate drive signal.

For example, the data write circuit 02 may transmit the data signal to the third node N3, and control the second node N2 and the first node N1 to be conducted, in the case that the potential of the gate drive signal is the first potential. In this case, where the drive circuit 04 controls the second node N2 and the third node N3 to be conducted under the control of the first node N1, the drive transistor T0 in the drive circuit 04 may be connected in the same fashion as a diode, and the potential of the first node N1 and the potential of the third node N3 may be the same. In this way, the purpose of writing the data signal to the first node N1 is achieved.

By setting the data write circuit 02 to be connected to the second node N2 and the third node N3, and setting the data write circuit 02 to possess the functions introduced in the above embodiments shown in FIG. 5, a voltage threshold Vth of the drive transistor T0 may be concurrently written to the first node N1 in the case that the data signal is written to the first node N1. Furthermore, the drive current finally transmitted by the drive circuit 04 to the light-emitting element L1 is independent of the voltage threshold Vth of the drive transistor T0 in the drive circuit 04. In this way, the problem of inaccurate transmitted drive current caused by the fluctuation of the voltage threshold Vth is reliably avoided, and a greater display effect is further ensured.

Figure 6:
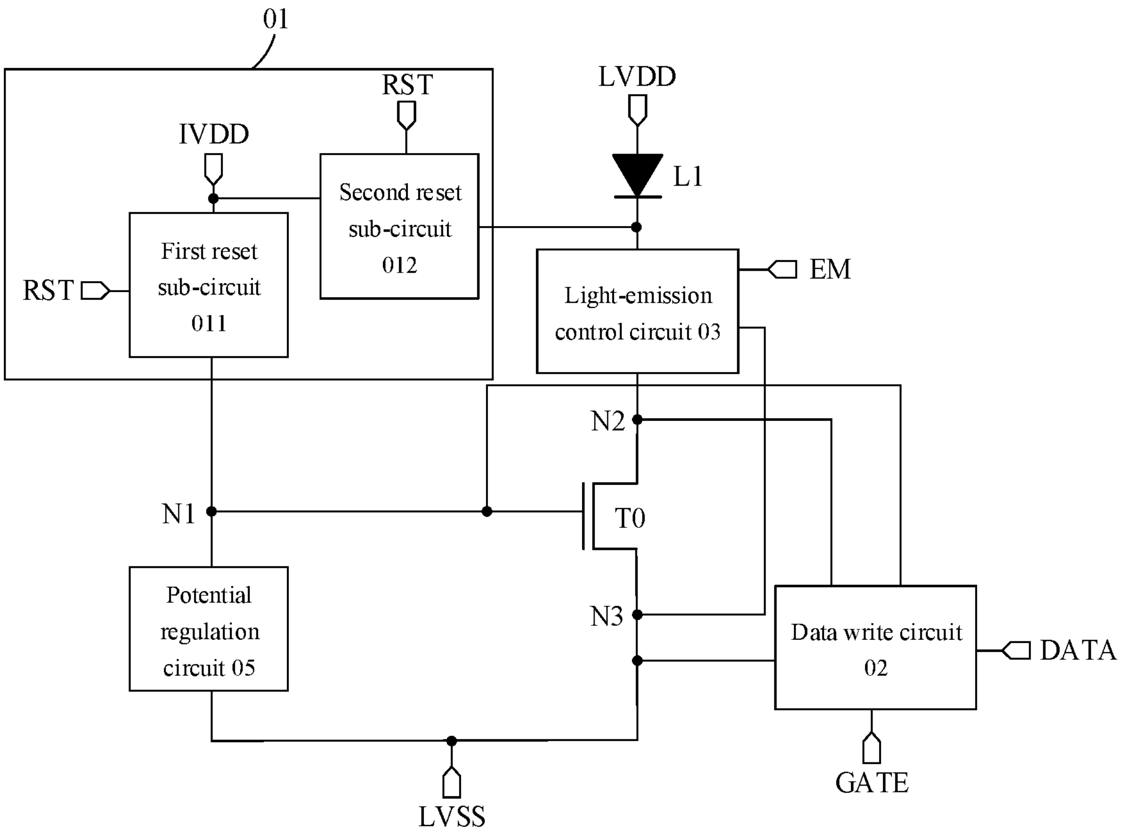
FIG. 6 is a schematic structural diagram of still another pixel circuit according to an embodiment of the present disclosure.

FIG. 6 is a schematic structural diagram of still another pixel circuit according to an embodiment of the present disclosure. As shown in FIG. 6, the reset circuit 01 may include a first reset sub-circuit 011 and a second reset sub-circuit 012.

The first reset sub-circuit 011 may be connected to the reset control terminal RST, the reset power terminal IVDD, and the first node N1. The first reset sub-circuit 011 may be configured to transmit the reset power signal to the first node N1 in response to the reset control signal.

For example, the first reset sub-circuit 011 may transmit the reset power signal to the first node N1 in the case that the potential of the reset control signal is the first potential.

The second reset sub-circuit 012 may be connected to the reset control terminal RST, the reset power terminal IVDD, and the cathode of the light-emitting element L1. The second reset sub-circuit 012 may be configured to transmit the reset power signal to the cathode of the light-emitting element L1 in response to the reset control signal.

For example, the second reset sub-circuit 012 may transmit the reset power signal to the cathode of the light-emitting element L1 in the case that the potential of the reset control signal is the first potential.

Figure 7:
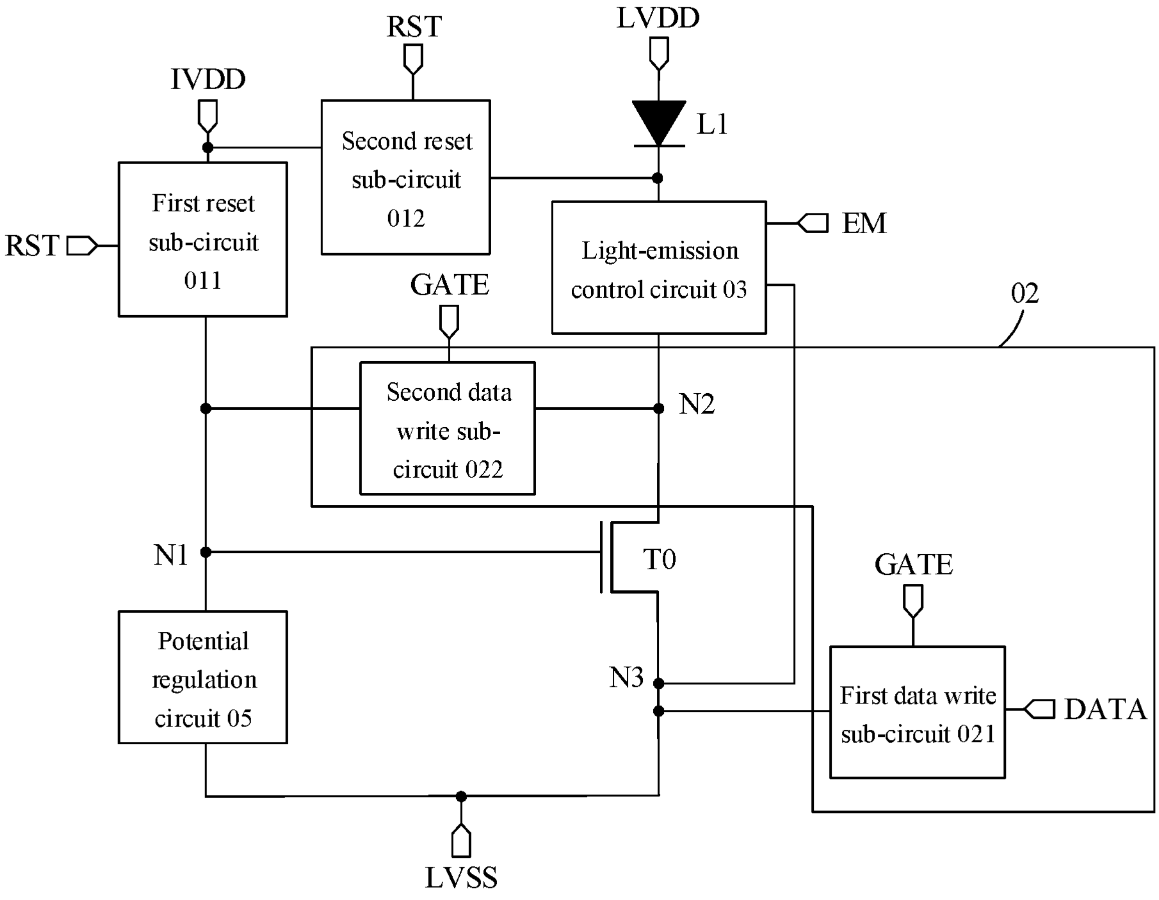
FIG. 7 is a schematic structural diagram of still another pixel circuit according to an embodiment of the present disclosure.

FIG. 7 is a schematic structural diagram of still another pixel circuit according to an embodiment of the present disclosure. As shown in FIG. 7, the data write circuit includes a first data write sub-circuit 021 and a second data write sub-circuit 022.

The first data write sub-circuit 021 may be connected to the gate signal terminal GATE, the data signal terminal DATA, and the third node N3. The first data write sub-circuit 021 may be configured to transmit the data signal to the third node N3 in response to the gate drive signal.

For example, the first data write sub-circuit 021 may transmit the data signal to the third node N3 in the case that the potential of the gate drive signal is the first potential.

The second data write sub-circuit 022 may be connected to the gate signal terminal GATE, the second node N2, and the first node N1. The second data write sub-circuit 022 may be configured to control conduction/non-conduction between the second node N2 and the first node N1 in response to the gate drive signal.

For example, the second data write sub-circuit 022 may control the second node N2 and the first node N1 to be conducted in the case that the potential of the gate drive signal is the first potential.

Figure 8:
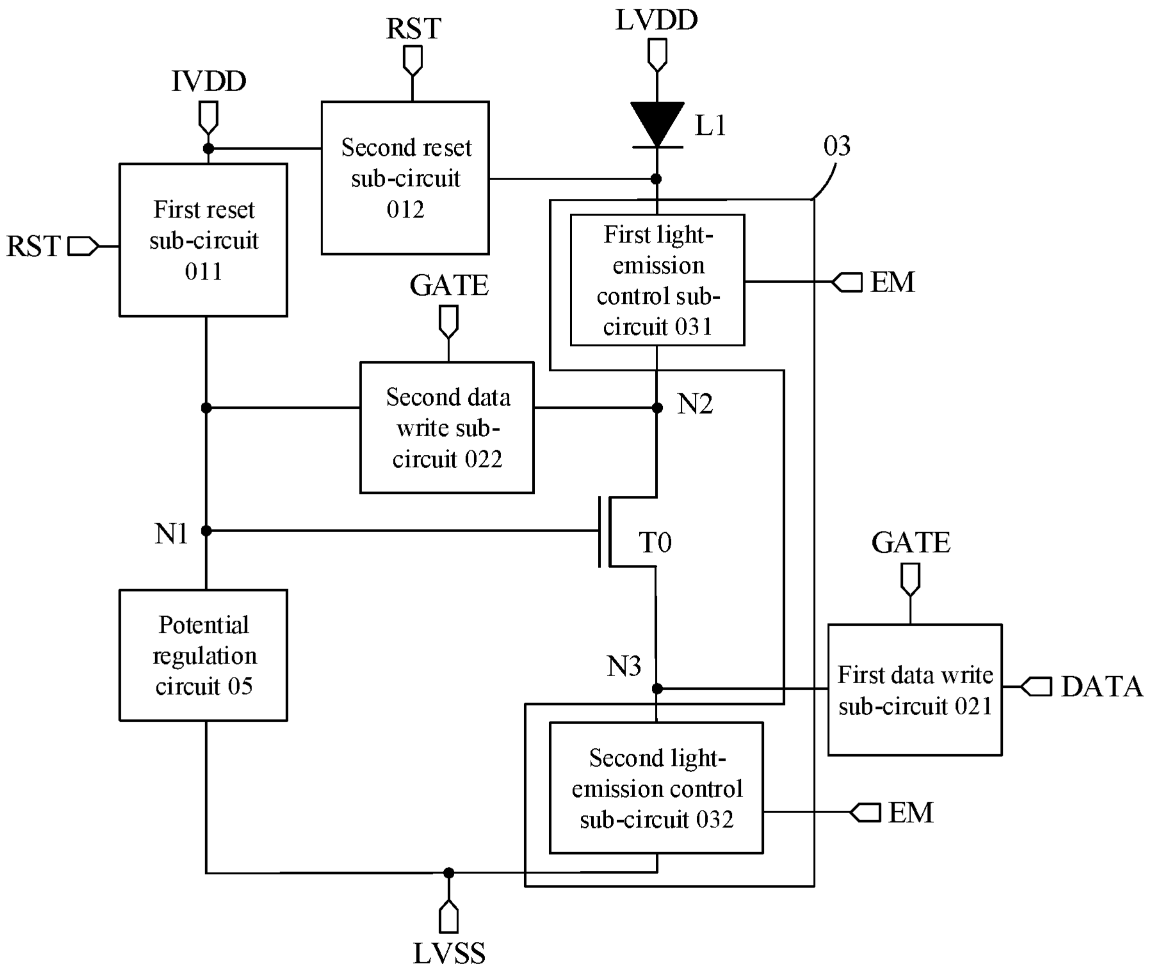
FIG. 8 is a schematic structural diagram of still another pixel circuit according to an embodiment of the present disclosure.

FIG. 8 is a schematic structural diagram of still another pixel circuit according to an embodiment of the present disclosure. As shown in FIG. 8, the light-emission control circuit 03 may include a first light-emission control sub-circuit 031 and a second light-emission control sub-circuit 032.

The first light-emission control sub-circuit 031 may be connected to the light-emission control terminal EM, the cathode of the light-emitting element L1, and the second node N2. The first light-emission control sub-circuit 031 may be configured to control conduction/non-conduction between the cathode of the light-emitting element L1 and the second node N2 in response to the light-emission control signal.

For example, the first light-emission control sub-circuit 031 may control the cathode of the light-emitting element L1 and the second node N2 to be conducted in the case that the potential of the light-emission control signal is the first potential, and control the cathode of the light-emitting element L1 to be disconnected to the second node N2 in the case that the potential of the light-emission control signal is the second potential.

The second light-emission control sub-circuit 032 may be connected to the light-emission control terminal EM, the third node N3, and the pull-down power terminal LVSS. The second light-emission control sub-circuit 032 may be configured to control conduction/non-conduction between the third node N3 and the pull-down power terminal LVSS in response to the light-emission control signal.

For example, the second light-emission control sub-circuit 032 may control the third node N3 and the pull-down power terminal LVSS to be conducted in the case that the potential of the light-emission control signal is the first potential, and control the third node N3 to be disconnected to the pull-down power terminal LVSS in the case that the potential of the light-emission control signal is the second potential.

Figure 9:
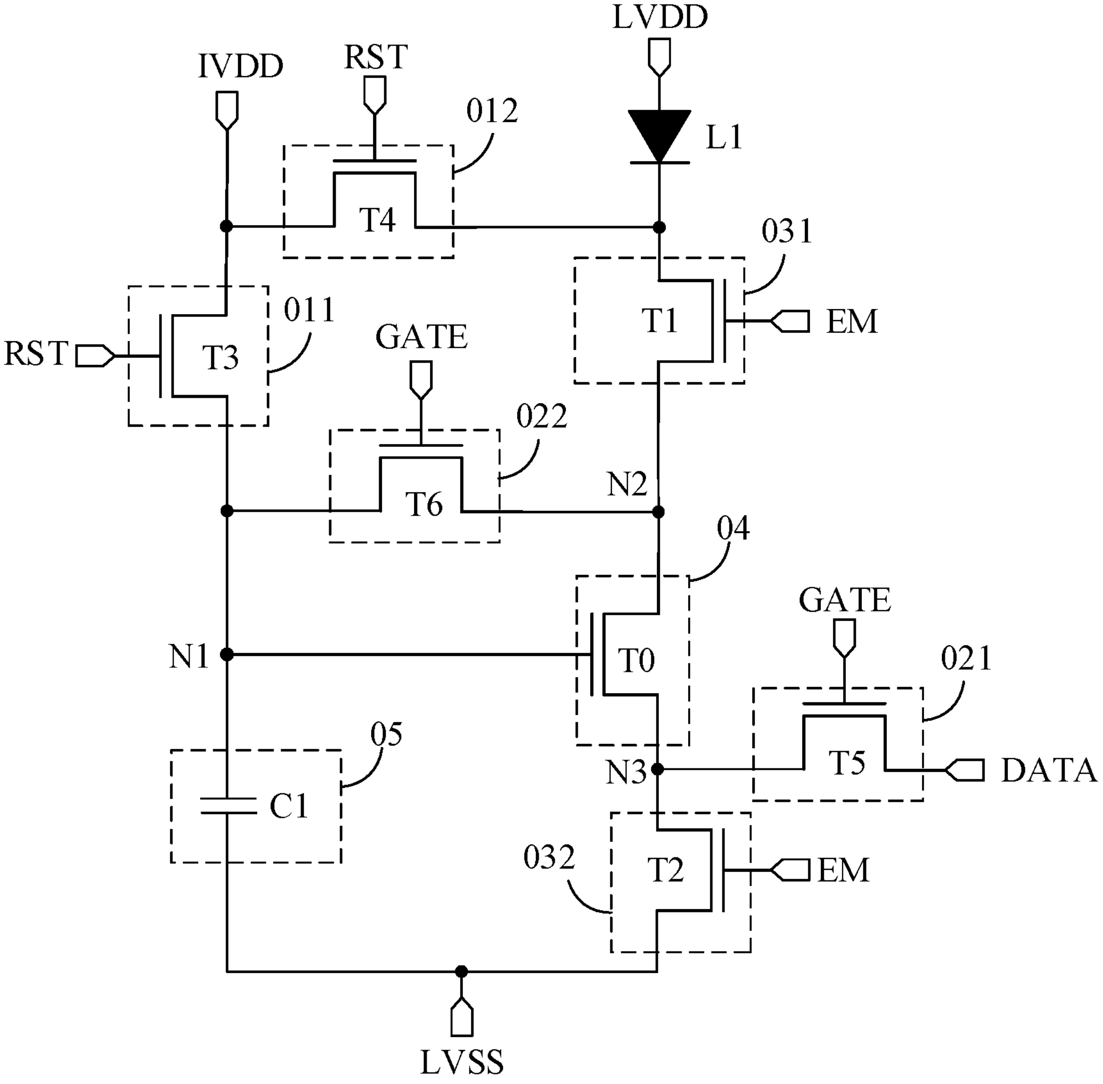
FIG. 9 is a schematic structural diagram of still another pixel circuit according to an embodiment of the present disclosure.

FIG. 9 is a schematic structural diagram of still another pixel circuit according to an embodiment of the present disclosure. As shown in FIG. 9, the potential regulation circuit 05 as described in the foregoing embodiments may include: a storage capacitor C1.

A first end of the storage capacitor C1 may be connected to the first node N1, and a second end of the storage capacitor C1 may be connected to the pull-down power terminal LVSS.

Still referring to FIG. 9, the first light-emission control sub-circuit 031 may include a first light-emission control transistor T1. The second light-emission control sub-circuit 032 may include a second light-emission control transistor T2.

A gate electrode of the first light-emission control transistor T1 may be connected to the light-emission control terminal EM, a first electrode of the first light-emission control transistor T1 may be connected to the cathode of the light-emitting element L1, and a second electrode of the first light-emission control transistor T1 may be connected to the second node N2.

A gate electrode of the second light-emission control transistor T2 may be connected to the light-emission control terminal EM, a first electrode of the second light-emission control transistor T2 may be connected to the third node N3, and a second electrode of the second light-emission control transistor T2 may be connected to the pull-down power terminal LVSS.

Still referring to FIG. 9, the first reset sub-circuit 011 may include a first reset transistor T3. The second reset sub-circuit 031 includes a second reset transistor T4.

A gate electrode of the first reset transistor T3 may be connected to the reset control terminal RST, a first electrode of the first reset transistor T3 may be connected to the reset power terminal IVDD, and a second electrode of the first reset transistor T3 may be connected to the first node N1.

A gate electrode of the second reset transistor T4 may be connected to the reset control terminal RST, a first electrode of the second reset transistor T4 may be connected to the reset power terminal IVDD, and a second electrode of the second reset transistor T4 may be connected to the cathode of the light-emitting element L1.

Still referring to FIG. 9, the first data write sub-circuit 021 may include a first data write transistor T5. The second data write sub-circuit 022 may include a second data write transistor T6.

A gate electrode of the first data write transistor T5 may be connected to the gate signal terminal GATE, a first electrode of the first data write transistor T5 may be connected to the data signal terminal DATA, and a second electrode of the first data write transistor T5 may be connected to the third node N3.

A gate electrode of the second data write transistor T6 may be connected to the gate signal terminal GATE, a first electrode of the second data write transistor T6 may be connected to the second node N2, and a second electrode of the second data write transistor T6 may be connected to the first node N1.

It can be seen based on the above description that, in the embodiments of the present disclosure, the cathode of the light-emitting element L1 is connected to the drain electrode of the drive transistor T0. The first reset transistor T3 and the second reset transistor T4 are connected to the reset power terminal IVDD. The storage capacitor C1 is connected to another power terminal (i.e., the pull-down power terminal LVSS) independent of the reset power terminal IVDD. In this way, it can be seen in combination with FIG. 9 that the potentials of the anode and cathode of the light-emitting element L1 may not change under the influence of the potential stored by the storage capacitor C1, and the storage capacitor C1 does not regulate, via a coupling action thereof, the potential of the first node N1 (i.e., the gate electrode of the drive transistor T0) based on the potential of any electrode of the light-emitting element L1. Furthermore, the stability of the potential of the first node N1 is ensured.

It should be noted that the pixel circuit shown in FIG. 9 is in a 7T1C (i.e., 7 transistors and 1 capacitor) structure. The pixel circuit as defined in the embodiments of the present disclosure may further be adapted to other structures, such as 6T1C.

It should further be noted that the above embodiments are all defined by taking N-type transistors as all the transistors and taking the first potential as a high potential with respect to the second potential, as an example. The transistors may further be a P-type transistor. When the transistors are the P-type transistor, the first potential is a low potential with respect to the second potential. In addition, in the case that the transistors are the P-type transistor, in combination with FIG. 5, the data write circuit 02 may merely be connected to the first node N1 and the third node N3, without the connection to the second node N2. That is, in combination with FIG. 9, the first electrode of the second data write transistor T6 may be connected to the third node N3, and the second electrode of the second data write transistor T6 may be connected to the first node N1.

In summary, the embodiments of the present disclosure provide a pixel circuit. The drive circuit in the pixel circuit may control conduction/non-conduction between the second node and the third node under the control of the potential of the first node. The light-emission control circuit in the pixel circuit may control conduction/non-conduction between the cathode of the light-emitting element and the second node, and control conduction/non-conduction between the third node and the pull-down power terminal, under the control of the light-emission control signal. In this way, it can be known that the potential of the first node is not affected by the potential of the anode of the light-emitting element. Furthermore, in the case that the cathode of the light-emitting element and the second node are conducted, the second node and the third node are conducted, and the third node and the pull-down power terminal are conducted, the light-emitting element may emit light reliably. The display device including the pixel circuit possesses a greater display effect.

Figure 10:
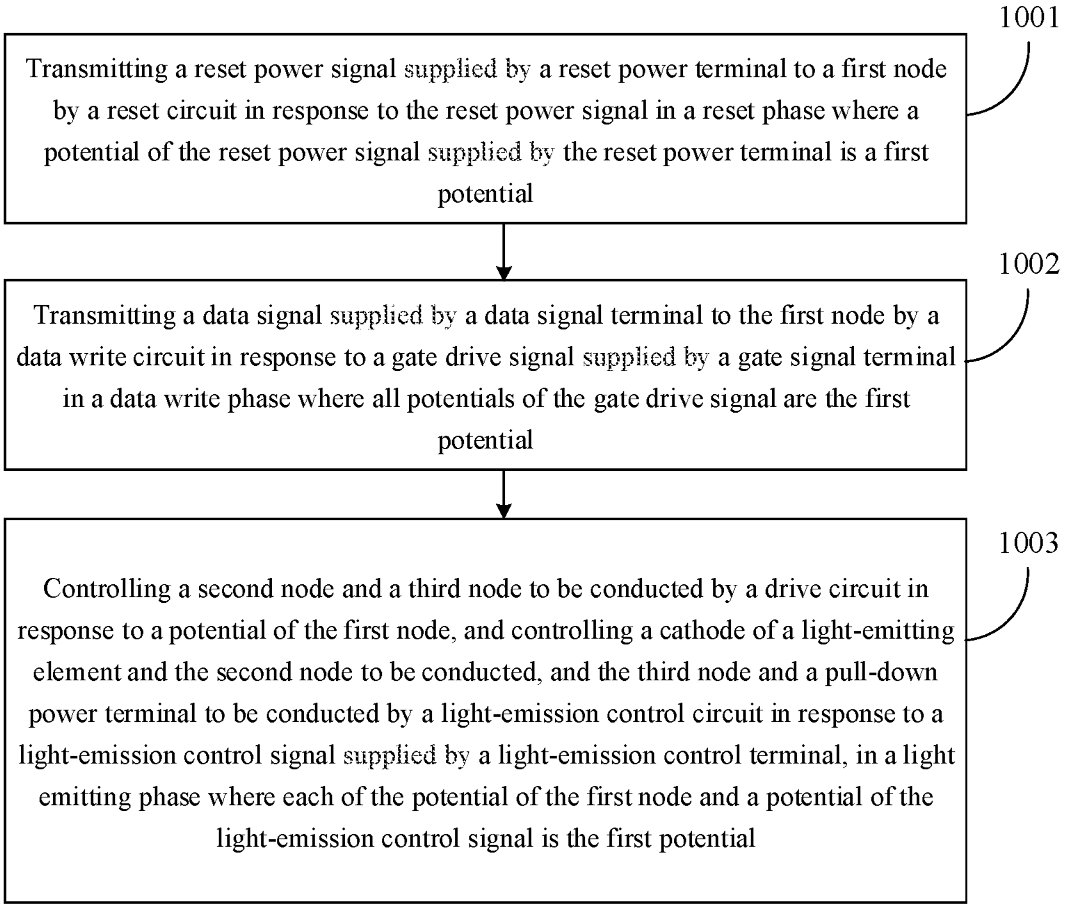
FIG. 10 is a flowchart of a method for driving a pixel circuit according to an embodiment of the present disclosure.

FIG. 10 is a flowchart of a method for driving a pixel circuit according to an embodiment of the present disclosure. The method may be applicable to the drive of the pixel circuit as defined in any one of FIGS. 1 to 9. As illustrated in FIG. 10, the method may include the following processes.

In S1001, a reset circuit transmits a reset power signal supplied by a reset power terminal to a first node in response to the reset power signal in a reset phase where a potential of the reset power signal supplied by the reset power terminal is a first potential.

Optionally, the potential of the reset power signal may be the first potential.

In S1002, a data write circuit transmits a data signal supplied by a data signal terminal to the first node in response to a gate drive signal supplied by a gate signal terminal in a data write phase where all potentials of gate drive signals are the first potential.

In step 1003, a drive circuit controls a second node and a third node to be conducted in response to a potential of the first node, and a light-emission control circuit controls a cathode of a light-emitting element and the second node to be conducted, and the third node and a pull-down power terminal to be conducted, in response to a light-emission control signal supplied by a light-emission control terminal, in a light emitting phase where each of the potential of the first node and a potential of a light-emission control signal is the first potential.

Illustratively, the principle of driving the pixel circuit defined in the embodiments of the present disclosure is described in detail by taking N-type transistors as the transistors in the pixel circuit illustrated in FIG. 9 and taking the first potential as a high potential with respect to the second potential, as an example.

Figure 11:
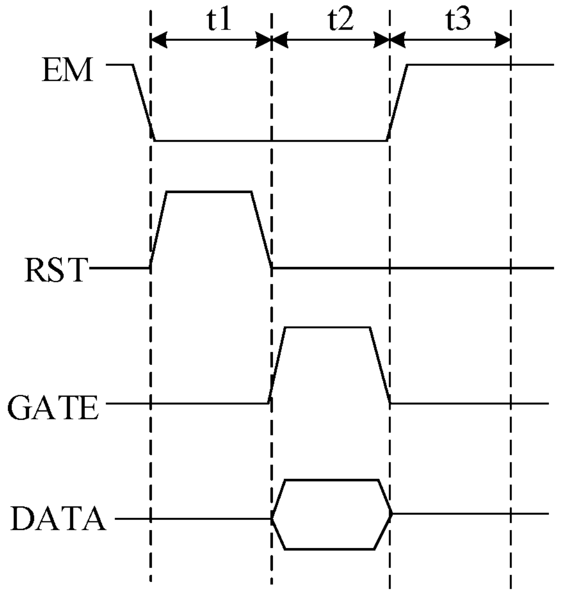
FIG. 11 is a timing diagram of signal terminals in a pixel circuit according to an embodiment of the present disclosure.

FIG. 11 is a timing diagram of signal terminals in a pixel circuit according to an embodiment of the present disclosure. As shown in FIG. 11, in the reset phase t1, the potential of the reset control signal supplied by the reset control terminal RST is the first potential, and both the first reset transistor T3 and the second reset transistor T4 are turned on. The reset power signal supplied by the reset power terminal IVDD is transmitted to the first node N1 via the turned-on first reset transistor T3, and is transmitted to the cathode of the light-emitting element L1 via the turned-on second reset transistor T4. In this way, where the potential of the reset power signal supplied by the reset power terminal IVDD is identified with V_ivdd, in the reset phase t1, each of the potential of the first node N1 and the potential of the cathode of the light-emitting element L1 is set as V_ivdd, which may be the first potential.

Figure 12:
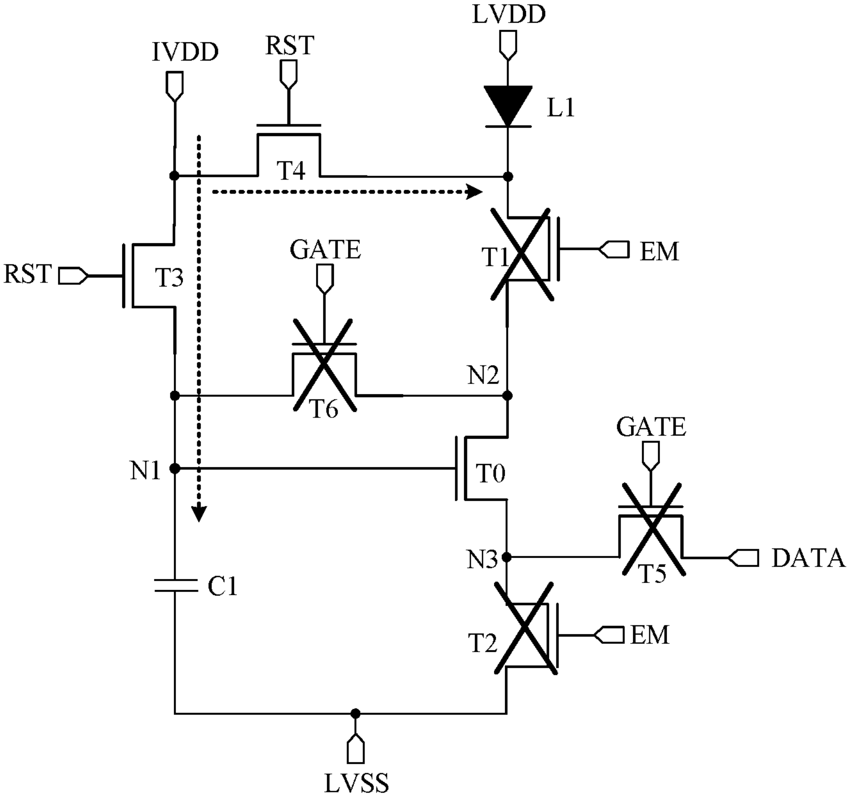
FIG. 12 is an equivalent circuit diagram of a pixel circuit in a reset phase according to an embodiment of the present disclosure.

In addition, referring to FIG. 11, in the reset phase t1, each of the potential of the gate drive signal supplied by the gate signal terminal GATE and the potential of the light-emission control signal supplied by supplied by the light-emission control terminal EM is the second potential. In this way, the first light-emission control transistor T1, the second light-emission control transistor T2, the first data write transistor T5, and the second data write transistor T6 may be all turned off. Reference may be made to FIG. 12 for an equivalent circuit diagram of the pixel circuit in the reset phase t1.

In the data write phase t2, the potential of the reset control signal may jump to the second potential, and the first reset transistor T3 and the second reset transistor T4 are both turned off. The potential of the gate drive signal supplied by the gate signal terminal GATE jumps to the first potential. The potential of the first node N1 is maintained at V_ivdd, i.e., the first potential, under the coupling action of the storage capacitor C1. The first data write transistor T5, the second data write transistor T6, and the drive transistor T0 are all turned on, and the drive transistor T0 is connected in the same fashion as the diode, i.e., operating in a saturation zone, under the control of the turned-on second data write transistor T6. The data signal supplied by the data signal terminal DATA is transmitted to the third node N3 via the turned-on first data write transistor T5.

The potential V_ivdd of the reset power signal supplied by the reset power terminal IVDD written to the first node N1 in the reset phase t1 is greater than the potential of the data signal written to the first node N1 in the data write phase t2, and the voltage threshold Vth of the N-type drive transistor T0 is a positive number. Therefore, the first node N1 directly connected to the storage capacitor C1 continuously discharges along a path from the second node N2 to the third node N3, that is, the potential of the first node N1 continuously decreases, until the potential of the first node N1 decreases to Vdata+Vth, the drive transistor T0 is turned off, and the data write phase t2 ends. Vdata represents the potential of the data signal.

Figure 13:
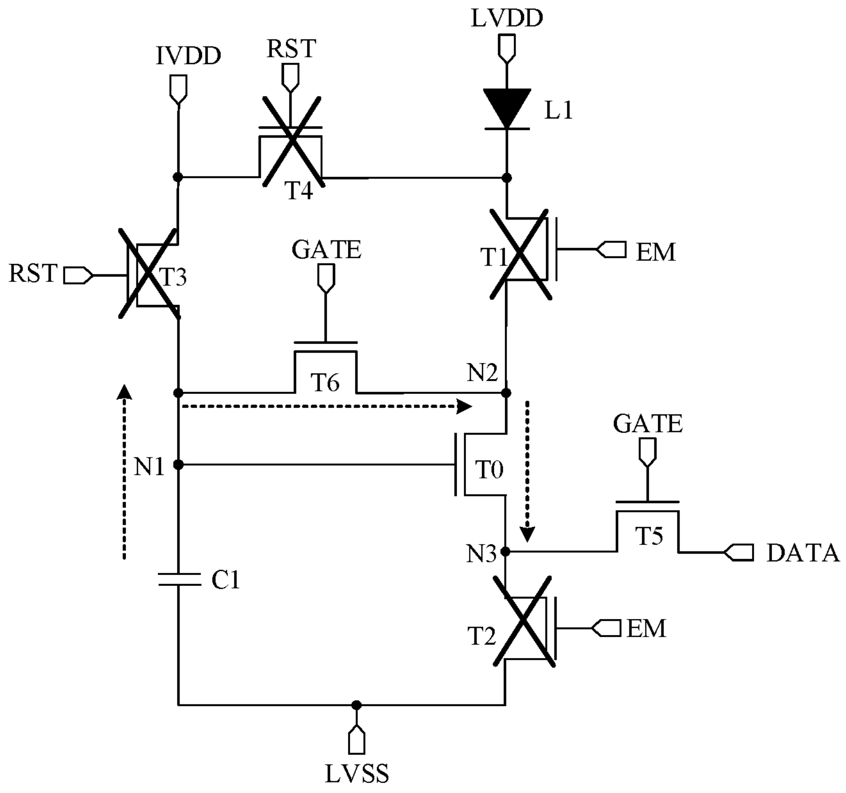
FIG. 13 is an equivalent circuit diagram of a pixel circuit in a data write phase according to an embodiment of the present disclosure.

In addition, referring to FIG. 11, in the data write phase t2, the potential of the light-emission control signal is maintained at the second potential. In this way, both the first light-emission control transistor T1 and the second light-emission control transistor T2 may be turned off. Reference may be made to FIG. 13 for an equivalent circuit diagram of the pixel circuit in the data write phase t2.

In the light emitting phase t3, the potential of the gate drive signal jumps to the second potential, and both the first data write transistor T5 and the second data write transistor T6 are turned off. The potential of the light-emission control signal jumps to the first potential, and both the first light-emission control transistor T1 and the second light-emission control transistor T2 are turned on. The potential of the first node N1 is still the first potential Vdata+Vth, and the drive transistor T0 is turned on. In this way, the drive power terminal LVDD, the light-emitting element L1, the first light-emission control transistor T1, the drive transistor T0, the second light-emission control transistor T2, and the pull-down power terminal LVSS may form a loop. The pull-down power signal supplied by the pull-down power terminal LVSS may be transmitted to the third node N3 via the second light-emission control transistor T2. The drive transistor T0 may transmit the drive signal to the second node N2 in response to the potential of the first node N1 and the potential of the third node N3. The drive signal may be then transmitted to the light-emitting element L1 via the turned-on first light-emission control transistor T1, thereby driving the light-emitting element L1 to emit light.

Figure 14:
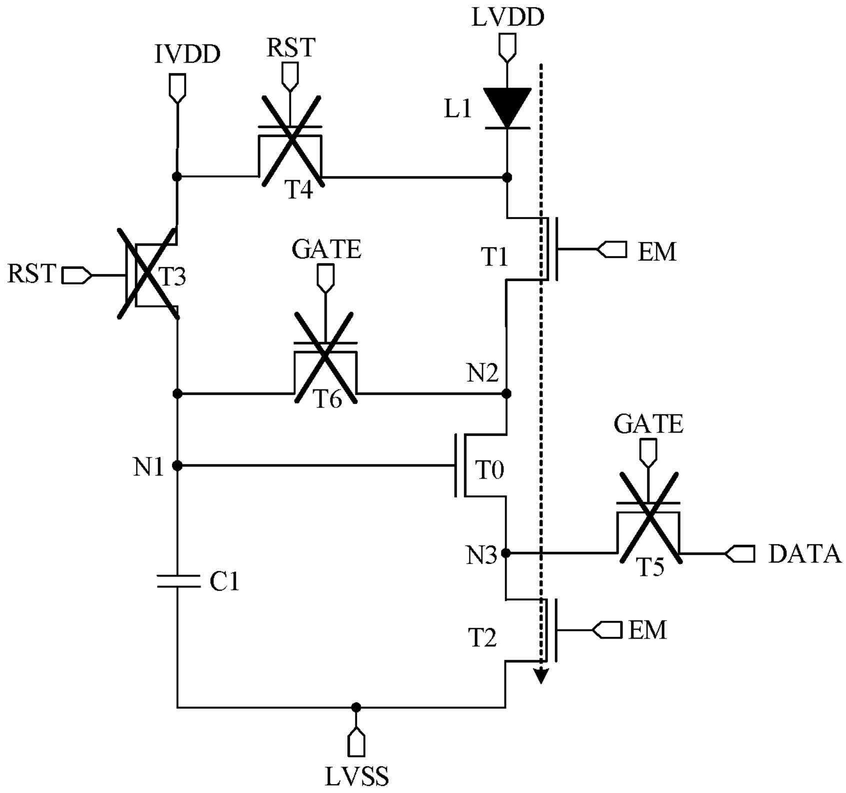
FIG. 14 is an equivalent circuit diagram of a pixel circuit in a light emitting phase according to an embodiment of the present disclosure.

In addition, referring to FIG. 11, in the light emitting phase t3, the potential of the reset control signal is maintained at the second potential. In this way, both the first reset transistor T3 and the second reset transistor T4 are turned off. Reference may be made to FIG. 14 for an equivalent circuit diagram of the pixel circuit in the light emitting phase t3.

Optionally, in the case that the potential of the pull-down power signal is V_lvss, the potential Vs of the third node N3 (i.e., the source electrode s of the drive transistor T0) in the light emitting phase t3 is V_ivss. The drive signal transmitted by the drive transistor T0 to the light-emitting element L1 based on the potential Vdata+Vth of the first node N1 (i.e., the gate g of the drive transistor T0) and the potential V_lvss of the third node N3 may be a drive current.

The drive current Id may be: $Id=k(Vgs-Vth)^2=k(Vg-Vs-Vth)^2$ $=k(Vdata+Vth-V\_lvss-Vth)^2=k(Vdata-V\_lvss)^2$.

In the above equation, k represents a constant related to the process design of the drive transistor T0, and k may satisfy the following equation:

$$K=\frac{1}{2}\times\frac{W}{L}\times C_{ox}\times\mu.$$

In the above equation, μ represents a carrier mobility of the drive transistor T0, $C_{OX}$ represents a capacitance of a gate insulating layer of the drive transistor T0, and W/L represents an aspect ratio of the drive transistor T0. In this way, it can be determined that in the case that the light-emitting element L1 works normally, the magnitude of the drive current for driving the light-emitting element L1 is independent of the voltage threshold Vth of the drive transistor T0. Therefore, the influence of the threshold voltage Vth of the drive transistor T0 on the drive current is eliminated. That is, the voltage threshold Vth of the drive transistor T0 is effectively compensated, such that the screen display is more stable, the display uniformity is increased, and the display effect is improved.

In summary, the embodiments of the present disclosure provide a method for driving a pixel circuit. In the light emitting phase, the light-emission control circuit may control the cathode of the light-emitting element and the second node to be conducted, and control the third node and the pull-down power terminal to be conducted, under the control of the light-emission control signal. The drive circuit may control the second node and the third node to be conducted under the control of the potential of the first node. In this way, the potential of the first node is not affected by the potential of the anode of the light-emitting element. Furthermore, the light-emitting element may reliably emit light in the light emitting phase, and a display device including the pixel circuit possesses a greater display effect.

Figure 15:
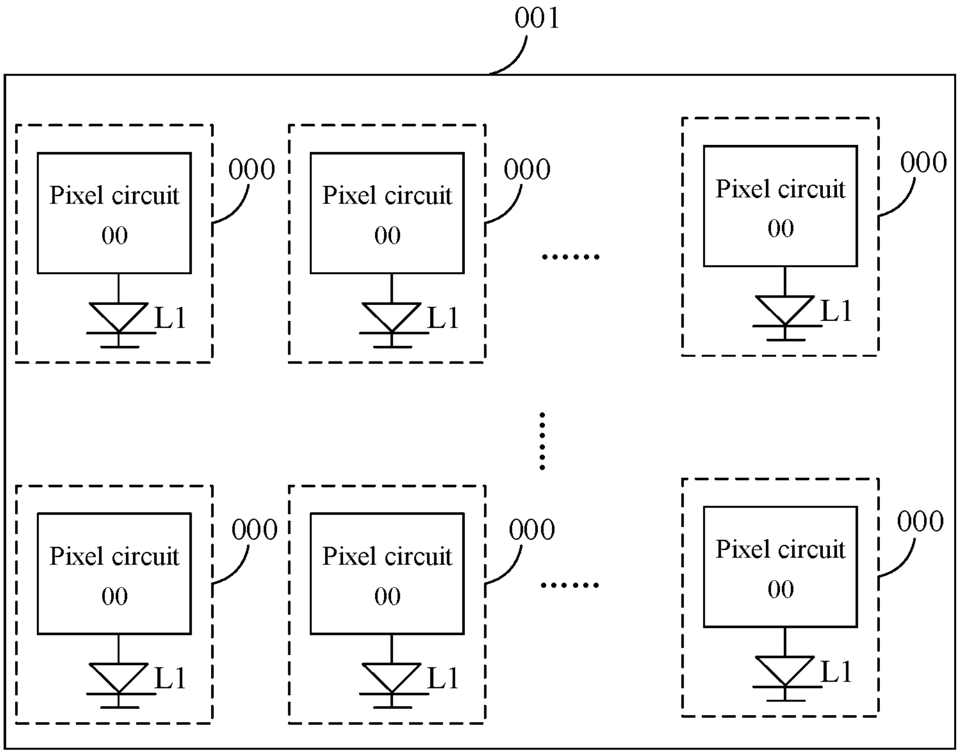
FIG. 15 is a schematic structural diagram of a display panel according to an embodiment of the present disclosure.

FIG. 15 is a schematic structural diagram of a display panel according to an embodiment of the present disclosure. As shown in FIG. 15, the display panel may include a base substrate 001 and a plurality of pixels 000 disposed on the base substrate 001.

The pixel 000 may include a light-emitting element L1 and the pixel circuit 00 as defined in any one of FIGS. 1 to 9. The pixel circuit 00 may be connected to the light-emitting element L1, and the pixel circuit 00 may be configured to drive the light-emitting element L1 to emit light.

Figure 16:
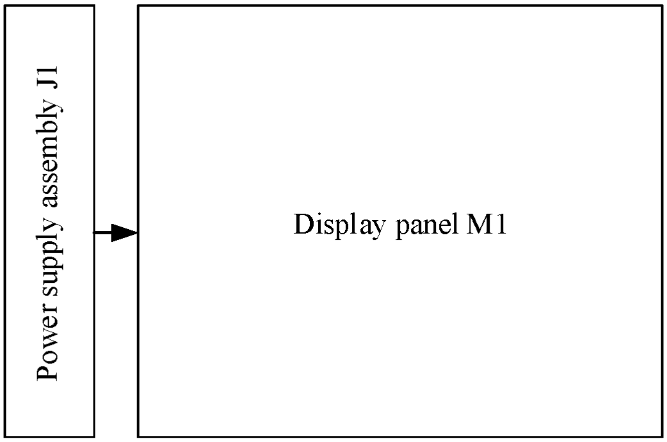
FIG. 16 is a schematic structural diagram of a display device according to an embodiment of the present disclosure.

FIG. 16 is a schematic structural diagram of a display device according to an embodiment of the present disclosure. As shown in FIG. 16, the display device may include a power supply assembly J1 and the display panel M1 as defined in FIG. 15.

The power supply assembly J1 may be connected to the display panel M1, and the power supply assembly 11 may be configured to supply power to the display panel M1.

Optionally, the light-emitting element L1 as described in the embodiment of the present disclosure may be an ultra light-emitting diode (ULED), which may also be referred to as a multi-zone light-distribution independent control LED. Furthermore, the pixel circuit driving the light-emitting element L1 may also be referred to as a ULED pixel circuit. A display device including the ULED pixel circuit may also be referred to as a ULED display device.

Optionally, the display device may include: a ULED display device, a micro LED display device, a liquid crystal display device, an electronic paper, an organic light-emitting diode (OLED) display device, a mobile phone, a tablet computer, a television, a displayer, a notebook computer, a digital photo frame or any other products or components having a display function.

Those skilled in the art may clearly understand that, for the convenience and conciseness of the description, the specific working processes of the pixel circuit, the display substrate, and the display device as defined above can be referred to corresponding processes in the foregoing method embodiments, and the details of which are not repeated herein. The symbol "/" generally indicates that the relationship between the former and later associated objects is selective.

Described above are merely optional embodiments of the present disclosure, and are not intended to limit the present disclosure. Any modifications, equivalent substitutions, improvements and the like made within the spirit and principle of the present disclosure shall fall within the protection scope of the present disclosure.

What is claimed is:

1. A pixel circuit, comprising: a reset circuit, a data write circuit, a light-emission control circuit, and a drive circuit; wherein the reset circuit is connected to a reset control terminal, a reset power terminal, and a first node, and the reset circuit is configured to transmit a reset power signal supplied by the reset power terminal to the first node in response to a reset control signal supplied by the reset control terminal;

the data write circuit is connected to a gate signal terminal, a data signal terminal, and the first node, and the data write circuit is configured to transmit a data signal supplied by the data signal terminal to the first node in response to a gate drive signal supplied by the gate signal terminal;

the light-emission control circuit is connected to a light-emission control terminal, a pull-down power terminal, a second node, a third node, and a cathode of a light-emitting element, and an anode of the light-emitting element is connected to a drive power terminal; the light-emission control circuit is configured to control conduction/non-conduction between the cathode of the light-emitting element and the second node, and control conduction/non-conduction between the third node and the pull-down power terminal, in response to a light-emission control signal supplied by the light-emission control terminal;

the drive circuit is connected to the first node, the second node, and the third node, and the drive circuit is configured to control conduction/non-conduction between the second node and the third node in response to a potential of the first node; and the reset circuit is further connected to the cathode of the light-emitting element, and the reset circuit is further configured to transmit the reset power signal to the cathode of the light-emitting element in response to the reset control signal.

2. The pixel circuit according to claim 1, wherein the data write circuit is further connected to the second node and the third node; and the data write circuit is configured to transmit the data signal to the third node and control conduction/non-conduction between the second node and the first node, in response to the gate drive signal.

3. The pixel circuit according to claim 2, wherein the data write circuit comprises a first data write sub-circuit and a second data write sub-circuit; wherein the first data write sub-circuit is connected to the gate signal terminal, the data signal terminal, and the third node, and the first data write sub-circuit is configured to transmit the data signal to the third node in response to the gate drive signal; and the second data write sub-circuit is connected to the gate signal terminal, the second node, and the first node, and the second data write sub-circuit is configured to control conduction/non-conduction between the second node and the first node in response to the gate drive signal.

4. The pixel circuit according to claim 3, wherein the first data write sub-circuit comprises a first data write transistor, and the second data write sub-circuit comprises a second data write transistor; wherein a gate electrode of the first data write transistor is connected to the gate signal terminal, a first electrode of the first data write transistor is connected to the data signal terminal, and a second electrode of the first data write transistor is connected to the third node; and a gate electrode of the second data write transistor is connected to the gate signal terminal, a first electrode of the second data write transistor is connected to the second node, and a second electrode of the second data write transistor is connected to the first node.

5. The pixel circuit according to claim 1, wherein the light-emission control circuit comprises: a first light-emission control sub-circuit and a second light-emission control sub-circuit; wherein the first light-emission control sub-circuit is connected to the light-emission control terminal, the cathode of the light-emitting element, and the second node, and the first light-emission control sub-circuit is configured to control conduction/non-conduction between the cathode of the light-emitting element and the second node in response to the light-emission control signal; and the second light-emission control sub-circuit is connected to the light-emission control terminal, the third node, and the pull-down power terminal, and the second light-emission control sub-circuit is configured to control conduction/non-conduction between the third node and the pull-down power terminal in response to the light-emission control signal.

6. The pixel circuit according to claim 5, wherein the first light-emission control sub-circuit comprises a first light-emission control transistor, and the second light-emission control sub-circuit comprises a second light-emission control transistor; wherein a gate electrode of the first light-emission control transistor is connected to the light-emission control terminal, a first electrode of the first light-emission control transistor is connected to the cathode of the light-emitting element, and a second electrode of the first light-emission control transistor is connected to the second node; and a gate electrode of the second light-emission control transistor is connected to the light-emission control terminal, a first electrode of the second light-emission control transistor is connected to the third node, and a second electrode of the second light-emission control transistor is connected to the pull-down power terminal.

7. The pixel circuit according to claim 1, wherein the reset circuit comprises: a first reset sub-circuit and a second reset sub-circuit; wherein the first reset sub-circuit is connected to the reset control terminal, the reset power terminal, and the first node, and the first reset sub-circuit is configured to transmit the reset power signal to the first node in response to the reset control signal; and the second reset sub-circuit is connected to the reset control terminal, the reset power terminal, and the cathode of the light-emitting element, and the second reset sub-circuit is configured to transmit the reset power signal to the cathode of the light-emitting element in response to the reset control signal.

8. The pixel circuit according to claim 7, wherein the first reset sub-circuit comprises a first reset transistor, and the second reset sub-circuit comprises a second reset transistor; wherein a gate electrode of the first reset transistor is connected to the reset control terminal, a first electrode of the first reset transistor is connected to the reset power terminal, and a second electrode of the first reset transistor is connected to the first node; and a gate electrode of the second reset transistor is connected to the reset control terminal, a first electrode of the second reset transistor is connected to the reset power terminal, and a second electrode of the second reset transistor is connected to the cathode of the light-emitting element.

9. The pixel circuit according to claim 1, wherein the pixel circuit further comprises a potential regulation circuit; wherein the potential regulation circuit is connected to the pull-down power terminal and the first node, and the potential regulation circuit is configured to regulate the potential of the first node in response to a pull-down power signal supplied by the pull-down power terminal.

10. The pixel circuit according to claim 9, wherein the potential regulation circuit comprises a storage capacitor; wherein a first end of the storage capacitor is connected to the first node, and a second end of the storage capacitor is connected to the pull-down power terminal.

11. The pixel circuit according to claim 1, wherein the drive circuit comprises a drive transistor; wherein a gate electrode of the drive transistor is connected to the first node, a first electrode of the drive transistor is connected to the second node, and a second electrode of the drive transistor is connected to the third node.

12. A method for driving a pixel circuit, applicable to the pixel circuit according to claim 1, the method comprising:

transmitting a reset power signal supplied by a reset power terminal to a first node by a reset circuit in response to the reset power signal in a reset phase where a potential of the reset power signal supplied by the reset power terminal is a first potential, wherein the potential of the reset power signal is the first potential;

transmitting a data signal supplied by a data signal terminal to the first node by a data write circuit in response to a gate drive signal supplied by a gate signal terminal in a data write phase where all potentials of the gate drive signal are the first potential; and controlling a second node and a third node to be conducted by a drive circuit in response to a potential of the first node, and controlling a cathode of a light-emitting element and the second node to be conducted, and the third node and a pull-down power terminal to be conducted by a light-emission control circuit in response to a light-emission control signal supplied by a light-emission control terminal, in a light emitting phase where each of the potential of the first node and a potential of the light-emission control signal is the first potential.

13. A display panel, comprising: a base substrate and a plurality of pixels disposed on the base substrate; wherein each of the plurality of pixels comprises a light-emitting element, and a pixel circuit; wherein the pixel circuit is connected to the light-emitting elements, and is configured to drive the light-emitting element to emit light; and the pixel circuit comprises a reset circuit, a data write circuit, a light-emission control circuit, and a drive circuit; wherein the reset circuit is connected to a reset control terminal, a reset power terminal, and a first node, and the reset circuit is configured to transmit a reset power signal supplied by the reset power terminal to the first node in response to a reset control signal supplied by the reset control terminal;

the data write circuit is connected to a gate signal terminal, a data signal terminal, and the first node, and the data write circuit is configured to transmit a data signal supplied by the data signal terminal to the first node in response to a gate drive signal supplied by the gate signal terminal;

the light-emission control circuit is connected to a light-emission control terminal, a pull-down power terminal, a second node, a third node, and a cathode of a light-emitting element, and an anode of the light-emitting element is connected to a drive power terminal; the light-emission control circuit is configured to control conduction/non-conduction between the cathode of the light-emitting element and the second node, and control conduction/non-conduction between the third node and the pull-down power terminal, in response to a light-emission control signal supplied by the light-emission control terminal;

the drive circuit is connected to the first node, the second node, and the third node, and the drive circuit is configured to control conduction/non-conduction between the second node and the third node in response to a potential of the first node; and the reset circuit is further connected to the cathode of the light-emitting element, and the reset circuit is further configured to transmit the reset power signal to the cathode of the light-emitting element in response to the reset control signal.

14. A display device, comprising: a power supply assembly, and a display panel; wherein the power supply assembly is connected to the display panel, and the power supply assembly is configured to supply power to the display panel; and the display panel comprises a base substrate and a plurality of pixels disposed on the base substrate; wherein each of the plurality of pixels comprises a light-emitting element, and a pixel circuit; wherein the pixel circuit is connected to the light-emitting elements, and is configured to drive the light-emitting element to emit light; and the pixel circuit comprises a reset circuit, a data write circuit, a light-emission control circuit, and a drive circuit; wherein the reset circuit is connected to a reset control terminal, a reset power terminal, and a first node, and the reset circuit is configured to transmit a reset power signal supplied by the reset power terminal to the first node in response to a reset control signal supplied by the reset control terminal;

the data write circuit is connected to a gate signal terminal, a data signal terminal, and the first node, and the data write circuit is configured to transmit a data signal supplied by the data signal terminal to the first node in response to a gate drive signal supplied by the gate signal terminal;

the light-emission control circuit is connected to a light-emission control terminal, a pull-down power terminal, a second node, a third node, and a cathode of a light-emitting element, and an anode of the light-emitting element is connected to a drive power terminal; the light-emission control circuit is configured to control conduction/non-conduction between the cathode of the light-emitting element and the second node, and control conduction/non-conduction between the third node and the pull-down power terminal, in response to a light-emission control signal supplied by the light-emission control terminal;

the drive circuit is connected to the first node, the second node, and the third node, and the drive circuit is configured to control conduction/non-conduction between the second node and the third node in response to a potential of the first node; and the reset circuit is further connected to the cathode of the light-emitting element, and the reset circuit is further configured to transmit the reset power signal to the cathode of the light-emitting element in response to the reset control signal.

* * * * *